United States Patent [19]

Ohtsu

[11] Patent Number: 4,842,055
[45] Date of Patent: Jun. 27, 1989

[54] HEAT EXCHANGER

[75] Inventor: Seiichi Ohtsu, Yokohama, Japan

[73] Assignee: Kabushiki Kaisha Toshiba, Kawasaki, Japan

[21] Appl. No.: 175,325

[22] Filed: Mar. 30, 1988

[30] Foreign Application Priority Data

Aug. 4, 1987 [JP] Japan ................. 62-193831

[51] Int. Cl.[4] .................. F28D 7/02; F28F 9/02
[52] U.S. Cl. .................. 165/174; 122/406 B; 261/152; 159/4.04; 159/27.1; 159/26.2
[58] Field of Search .............. 165/174; 122/406 B, 122/508, 509, 34; 159/4.04, 27.1, 26.2, 28.3; 261/152, 153

[56] References Cited

U.S. PATENT DOCUMENTS

| 553,841 | 2/1896 | Cooper | 122/34 X |
|---|---|---|---|
| 1,403,784 | 1/1922 | Ingels | 165/174 |
| 1,725,399 | 8/1929 | Monet et al. | 122/406 B |
| 1,972,052 | 8/1934 | LaMonet | 122/406 B |
| 3,317,222 | 5/1967 | Maretzo | 285/55 |
| 4,300,481 | 11/1981 | Fisk | 122/406 B |
| 4,607,689 | 8/1986 | Mochida et al. | 165/110 |
| 4,697,634 | 10/1987 | Foucher et al. | 122/406 B X |

FOREIGN PATENT DOCUMENTS 54-2329 2/1979 Japan .
564489 8/1977 U.S.S.R. ............. 122/406 B Primary Examiner—Robert E. Garrett
Assistant Examiner—Carl D. Price
Attorney, Agent, or Firm—Foley & Lardner, Schwartz, Jeffery, Schwaab, Mack, Blumenthal & Evans

[57] ABSTRACT

A heat exchanger of vertical type in which fluid flows vertically downwardly comprises a cylindrical outer shell which is approximately divided by upper and lower tube plates into an upper plenum, a lower water passage, and an intermediate heat exchanging passage. A plurality of metal-made heat exchanger tubes are disposed in parallel in the heat exchanging passage with both ends supported by the upper and lower tube plates, respectively. A plurality of metal-made fluid flow throttling members are adjustably contacted to a lower end of the heat exchanger tube and inserted into the lower end opening of the corresponding heat exchanger tubes, respectively. Each of the throttling member is provided with a fine bore for throttling fluid flow, an upper tapered portion to be inserted and a lower cylindrical portion so that the tapered portion has an area contacting the end face of the heat exchanger tube to constitute metal-to-metal seal contact when the throttling members are inserted into the heat exchanger tubes.

9 Claims, 3 Drawing Sheets

HEAT EXCHANGER

BACKGROUND OF THE INVENTION

This invention relates to a heat exchanger of vertical type particularly adapted to prevent backward flow of a fluid, so-called recirculation, of high temperature delivered from an inlet side plenum to an outlet side plenum in response to variation of the static pressure in the outlet side chamber.

Heat exchangers have been widely used for heating and cooling fluid, and for extracting and yielding vaporized or condensed substances in chemical plants, petroleum chemical plants, power generation plants or like plants.

Although an example of application of a vaporizer as one kind of a heat exchanger adapted to extract vaporized substance or material is disclosed hereinbelow, it should be noted that the term "heat exchanger" used herein totally includes a heater, a cooler, a vaporizer and a condenser of the character described above.

A vaporizer, for example a vertical type naphtha vaporizer in a fuel cell power plant, has a construction as shown in FIG. 5.

Referring to FIG. 5, naphtha in the liquid state introduced into a shell 2 of a drum shape through a liquid naphtha inlet tube 1 enters into a header 3, and is then atomized into fine particles through spray nozzles 4 into an inlet plenum 5. A mixing gas essentially consisting of hydrogen gas and carbon dioxide gas is introduced through a mixing gas inlet 6 into the inlet side plenum 5 in which the mixing gas is mixed with the atomized naphtha. The mixed gas is thereafter delivered to heat exchanger or heat transfer tubes 7 which extend in parallel through a heat exchanging chamber 7a, each of which is supported at both ends by tube plates 12a and 12b, respectively, and at its intermediate portion by baffle plates 13a and 13b secured to the inner wall of the shell 2.

The mixed gas delivered into the heat exchanger tubes 7 flows therethrough and is heated through heat exchanging operation performed between the mixed gas in the heat exchanger tubes 7 and heating gas introduced into the shell 2 through a heating gas inlet 10 and flowing along the outer surfaces of the heat exchanger tubes 7. Due to the heat exchanging operation, the naphtha in the mixed gas is vaporized and flows as a superheated gas towards an outlet side plenum 8 which is located in the shell 2 at a position opposite to the inlet side plenum 5. The mixed gas is thereafter delivered as a fuel gas into a reactor, not shown, through a fuel gas outlet 9 provided at the wall of the outlet side plenum 8, and then is delivered into a reforming device, not shown.

The heating gas introduced into the shell 2 flows meanderingly along the outer surface of the respective heat exchanger tubes 7. During this process, the temperature of the heating gas is reduced by heat exchanging between the heating gas and the mixed gas in the heat exchanger tubes 7. The heating gas is finally discharged to the outside of the shell 2 through a heating gas outlet 11. It is of course desirable that the heating gas inlet 10 is disposed near the tube plate 12a and the heating gas outlet 11 is disposed near the tube plate 12b.

In the naphtha vaporizer of the character or construction described above, however, the backward flow, so-called recirculation, of the heated fuel gas from the outlet side plenum 8 towards the inlet side plenum 5 through the heat exchanger tubes 7 in the direction reverse to the ordinary flow direction thereof may be caused in a case where the naphtha atomized by the spray nozzles 4 is delivered into the heat exchanger tubes 7 together with the mixing gas with a non-uniformly distributed amount. Accordingly, the constant flow rate of liquid state naphtha through the respective heat exchanger tubes 7 cannot be maintained.

In general, when an average flow rate of the liquid state naphtha is ensured, the static head thereof can be maintained and the inner pressure in the outlet side plenum 8 is kept higher than that in the inlet side plenum 5, whereas when the flow rate of the liquid state naphtha is largely below the average flow rate thereof, the static head is also lowered and the pressure relationship between the plenum 5 and 8 may be reversed through the heat exchanger tubes 7. In such an adverse state, the heated fuel gas in the outlet side plenum 8 flows reversely therefrom towards the inlet side plenum 5, thus starting the recirculation of the heated fuel gas.

According to a mock-up test to examine the possibility of the occurrence of the recirculation, it was observed that the liquid state naphtha having a flow rate about twice as much as the average flow rate flows in a certain heat exchanger tube 7 having the maximum flow rate, and the liquid state naphtha having a flow rate about half as much as the average flow rate flows in a certain heat exchanger tube 7 having the minimum flow rate. It is assumed from the result of this mock-up test that the heated fuel gas must flow reversely in the heat exchanger tube having the minimum flow rate of about half of the average flow rate.

Upon occurrence of such recirculation phenomenon of the heated fuel gas, the tube plate 12a of the inlet side plenum 5 and the heat exchanger tubes 7 may suffer from rapid temperature variation and extremely large thermal stresses will be generated. The repetition of such adverse phenomenon may finally result in breakages of these members due to accumulated fatigue.

SUMMARY OF THE INVENTION

An object of this invention is to eliminate defects or disadvantages in the prior art technique and to provide a heat exchanger having a construction capable of preventing an introduced gas from backwardly flowing thereby obviating fatigue breakages of headers and heat exchanger tubes located in the heat exchanger.

This and other objects can be achieved, according to this invention, by providing a heat exchanger of vertical type in which fluid flows vertically downwardly and in which a cylindrical outer shell is approximately divided by upper and lower tube plates into an upper plenum, an intermediate heat exchanging passage, and a lower plenum, and a plurality of metal-made heat exchanger tubes are disposed in parallel in the heat exchanging passage, both the ends of which are supported by the upper and lower tube plates, respectively, the heat exchanger being characterized by the location of a plurality of metal-made fluid flow throttling members adjustably contacted the lower end face of the heat exchanger tube and each adapted to be inserted into through holes provided in a support member, each of the throttling member being provided with a fine central bore for throttling a fluid flow, an upper tapered portion to be inserted into the heat exchanger tube and a lower cylindrical portion being continuous to the tapered portion so that the tapered portion has an area contacting the end face of the heat exchanger tube to constitute metal-to-metal contact when the throttling members are inserted into the heat exchanger tubes, respectively.

According to this invention of the character described above, since the fuel gas flow which enters into the inlet of the downstream side plenum through heat exchanger tubes is throttled by fluid flow throttling members provided with fine bores and inserted into the heat exchanger tubes, a pressure loss occurs at the throttling members and the static pressure reduces thereby increasing the pressure difference between the upper and the lower plenum, i.e. the inlet and outlet openings of the heat exchanger tubes, preventing the fluid from backwardly flowing and thus performing effective heat exchanging operation.

In a preferred embodiment, the heat exchanger is a naphtha vaporizer in which liquid state naphtha is introduced into the upper inlet side plenum where the naphtha is mixed with a mixing gas, and the mixed gas is subjected to the heat exchanging operation in the course of passing through the heat exchanger tubes by heating gas introduced into the heat exchanging tubes.

This invention will be described further in detail hereunder in conjunction with accompanying drawings.

DESCRIPTION OF THE PREFERRED EMBODIMENTS

Figure 1:
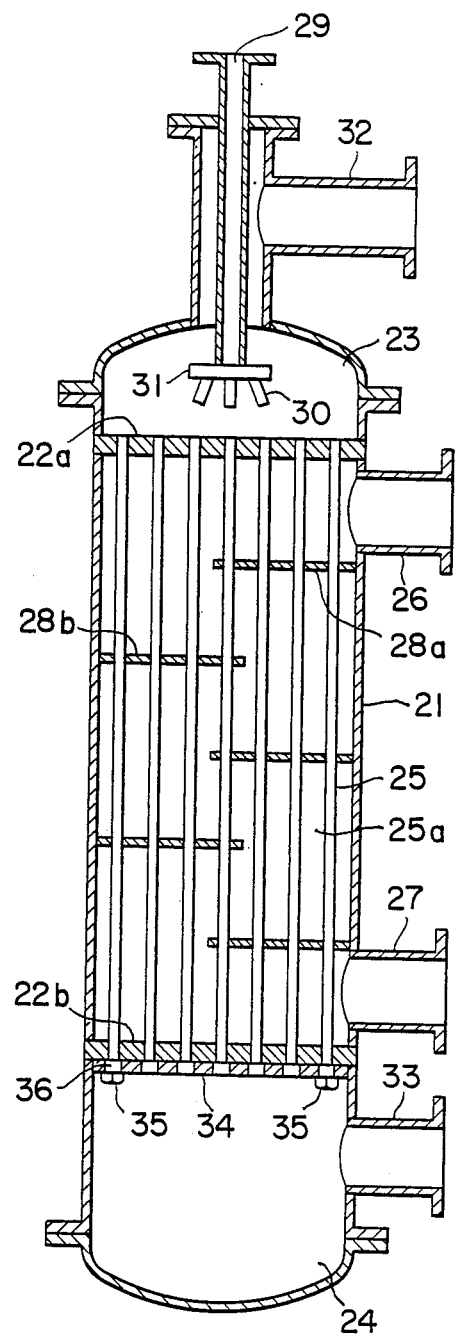
FIG. 1 is an elevational sectional view of a heat exchanger according to this invention.

Referring to FIG. 1, a shell 21 is in the form of a drum in which tube plates 22a and 22b are disposed so as to define an inlet side plenum 23 and an outlet side plenum 24 at axial end portions of the shell 21, respectively. Between both the plenum 23 and 24, an intermediate heat exchanging passage 25a is defined through which a plurality of metal-made heat exchanger tubes 25 are arranged in parallel so that both the ends of each heat exchanger tube 25 are supported by the tube plates 22a and 22b respectively to communicate with the inlet and outlet side plenum 23 and 24. The respective heat exchanger tubes 25 are also supported at intermediate portions by a plurality of baffle plates 28a and 28b in the form of a substantially semicircular disc, arranged bilaterally alternately in the vertical direction. A heating gas inlet 26 is fitted to the shell wall at a portion of the heat exchanging passage 25a near the upper tube plate 22a and a heating gas outlet 27 is fitted to the shell wall at a portion of the heat exchanging passage near the lower tube plate 22b.

A liquid state naphtha inlet tube 29 is connected to the inlet side plenum 23 coaxially arranged with the shell 21. The liquid state naphtha introduced through the inlet tube 29 is atomized into fine particles by means of spray nozzles 30 attached to a header 31 secured to the inner end of the inlet tube 29. The atomized naphtha gas is mixed with a mixing gas, essentially consisting of hydrogen gas and carbon dioxide gas, introduced into the inlet side plenum 23 through a mixing gas inlet 32.

The mixed gas flows from the inlet side plenum 23 towards the outlet side plenum 24 through the heat exchanger tubes 25, and the heating gas from the heating gas inlet 26 flows towards the heating gas outlet 27 in a meandering fashion due to the presence of the semicircular baffle plates 28a and 28b. Thus the effective heat exchanging operation between the heating gas and the mixed gas flowing through the heat exchanger tubes 25 can be carried out. The mixed gas after completion of the heat exchanging operation is introduced into the outlet side plenum 24 and discharged outwardly as a fuel gas through a fuel gas outlet 33.

Figure 5:
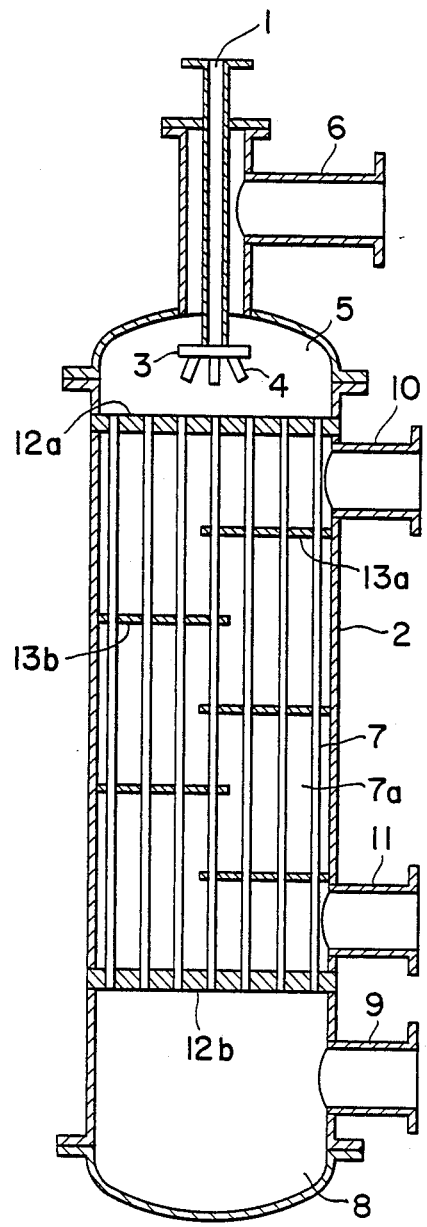
FIG. 5 is an elevational sectional view of a heat exchanger of a prior art.

These structures and operations of the naphtha vaporizer as a heat exchanger are substantially the same as those referred to hereinbefore with respect to the vaporizer shown in FIG. 5.

The naphtha vaporizer according to this invention, shown in FIG. 1, further comprises a support member 34 such as a disc plate which is provided with a plurality of through holes 36, having an inner surface provided with female screws, at portions corresponding to the end openings of the heat exchanger tubes 25 and detachably mounted to the lower tube plate 22b through bolts 35, and comprises a plurality of metal-made gas flow throttling members 37 which are adjustably contacted to the lower end face of the heat exchanger tube 25 and each inserted into a lower end opening of the heat exchanger tube 25.

Figure 2:
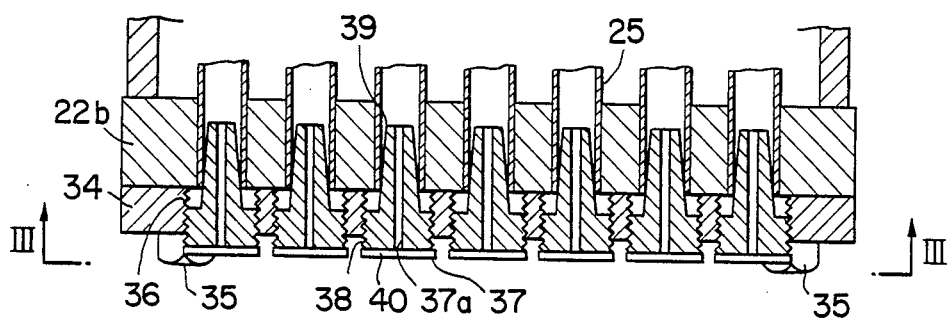
FIG. 2 is an enlarged sectional view showing structures of a support disc and fluid flow throttling members of the heat exchanger shown in FIG. 1.
Figure 3:
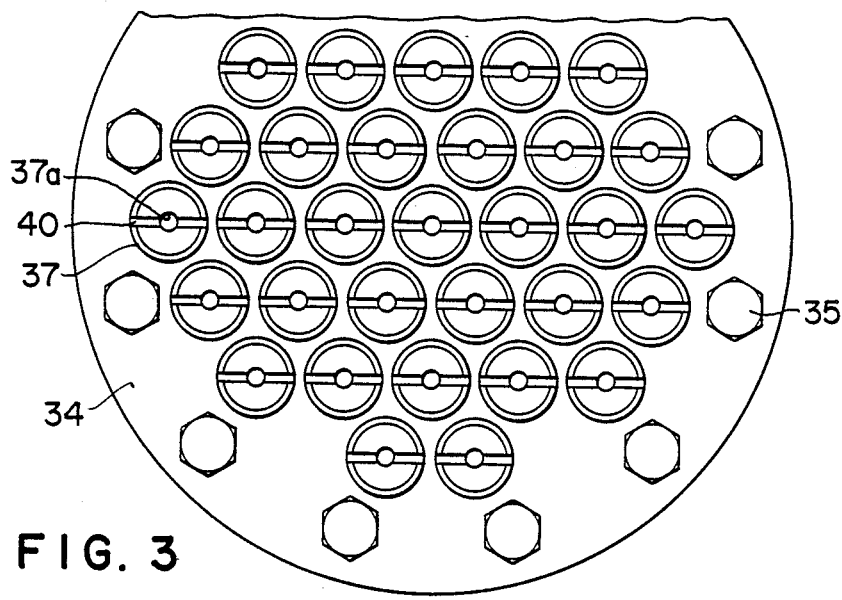
FIG. 3 is an end view, partially cut away, of the heat exchanger shown from arrowed direction III—III in FIG. 2.

The support disc plate 34 and the gas flow throttling members are shown in detail in FIGS. 2 and 3.

Each of the through holes 36 formed in the support disc plate 34 has a diameter larger by a certain constant amount than the outer diameter of the heat exchanger tube 25 as shown in FIG. 2. The gas flow throttling member is a cylindrical or tubular member 37 made of a metal material and having an upper tapered portion 39 and a lower cylindrical portion which is provided with male screws 38 which are engageable with the female screws of the through hole 36 when the tubular member 37 is fitted to the heat exchanger tube 25.

The tapered portion 39 abuts on the end face portion of the heat exchanger tube 25 in order to achieve metal-to-metal intimate contact. A fine axial through hole 37a is formed in the tapered tubular member 37 at a substantially central portion so as to throttle the gas flow passing therethrough. A groove 40 engageable with a screwing tool is formed on an outside end surface of the tubular member 37 as shown in FIGS. 2 and 3, thereby enabling rotation of the tubular member 37 when the same is to be fitted into the heat exchanger tube 25.

The naphtha vaporizer having the specific structure described above operates in the following manner.

The liquid state naphtha atomized in the inlet side plenum 23 through the spray nozzles 30 is mixed therein with the mixing gas from the mixing gas inlet 32, and the mixed gas thus obtained is distributed into the respective heat exchanger tubes 25. The mixed gas is heated, in the course of passing through the tubes 25, by the heating gas flowing along the outer surfaces of the tubes 25, and the heated gas is introduced into the outlet side plenum 24 as a fuel gas through the fine holes 37a formed in the respective tapered tubular members 37. The heated gas flow is throttled when passing through the fine holes 37a, thus creating a pressure loss at that portion. Accordingly, the static pressure near the outlet portions of the heat exchanger tubes 25 decreases whereas pressure difference between the inlet portions and the outlet portions of the heat exchanger tubes 25 increases.

Thus, even in a case where the flow rate of the mixing gas due to disuniform flow rate of the liquid state naphtha increases extremely, the pressure relationship between the inlet side and outlet side plenum 23 and 24 may not be reversed. As a result, recirculation of the fuel gas from the outlet side plenum 24 towards the inlet side water chamber 23 may not occur. Finally, the rapid temperature rise of the heat exchanger tubes 25 can also be effectively avoided.

In addition, the tapered portion 39 of the tubular member 37 abuts intimately on the end face of the heat exchanger tube 25 when they are assembled, to constitute a tight seal therebetween to ensure the pressure loss at that portion thereby preventing direct flow of the fuel gas into the outlet side plenum 24 without passing through the fine hole 37a of the tubular member 37. Moreover, in a case where the tube plate 22b is deformed by residual stresses caused by welding the respective heat exchanger tubes 25 to the tube plate 22b and where the heat exchanger tubes 25 are not secured at a predetermined position, the sealing effect can be ensured because of the fact that the location of the tapered tubular members 37 can be optionally adjusted by the screw engagement between the support member 34 and the throttling member 37.

A further advantage obtainable in the use of the tapered tubular members 37 resides in the following. When a sealing member such as a gasket is used for sealing the outlet ends of the heat exchanger tubes, the gasket is easily deteriorated because of the fact that the temperature of the fuel gas rises to about 300° C. or more. Therefore, the desired sealing effect cannot be expected. On the other hand, according to this invention, the heat exchanger tubes and the tapered portions of the tubular members constitute direct metal-to-metal contacts therebetween, thus enabling elimination of the gaskets and ensuring an excellent sealing effect.

Figure 4:
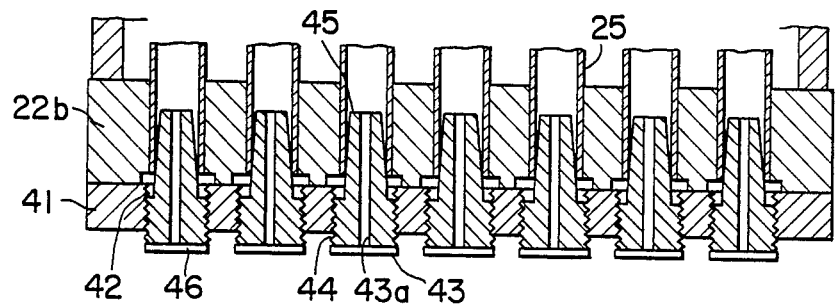
FIG. 4 is a sectional view similar to FIG. 2 showing another embodiment of this invention.

FIG. 4 shows a modification of the portion shown in FIG. 2, in which the heat exchanger tubes 25 are seal welded at portions inwardly apart by a constant distance from the surface of the tube plate 22b. In this modification, there is a lesser possibility of protrusion of the end portions of the heat exchanger tubes 25 inclusive of the welded portions beyond the surface of the tube plate 22b. Furthermore, as shown in FIG. 4, a disc plate 41 is provided with a plurality of screw holes 42 each having a diameter substantially equal to the outer diameter of the heat exchanger tube 25, wherein the threaded portion 44 of the tubular member 43 is screwed.

Referring to FIG. 4, reference numerals 45 and 46 designate a tapered portion and a groove of the tubular member 43, respectively, which correspond to the tapered portion 39 and the groove 40 of the tubular member 37 shown in FIGS. 2 and 3.

The tubular member 43 in FIG. 4 operates in substantially the same manner as that of the tubular member 37 of the former embodiment, so that the details thereof are not described herein.

According to the modification of FIG. 4, the tubular member 43 can be made compact as a whole structure in comparison with the tubular member 37, which may result in a easy handling of the same in the assembling work.

As described hereinabove, according to the heat exchanger of this invention, a gas flow throttling member is disposed for each heat exchanger tube through a support member at the lower end opening of the heat exchanger tube opened to the outlet plenum. As a result, the pressure loss at the lower end, i.e. outlet, opening of each heat exchanger tube can be increased. Accordingly, the reversal of the pressure relationship between the inlet and outlet side plenum may not occur under any operational condition of the heat exchanger. The recirculation of the fuel gas from the outlet side water chamber towards the inlet side plenum can be avoided whereby the tube plates, the heat exchanger tubes, and like members are prevented from being damaged or broken by fatigue thereof.

What is claimed is:

1. A heat exchanger of vertical type in which fluid flows vertically downwardly, comprising:
   a shell having sealed opposite ends;
   a pair of upper and lower tube plates disposed in said shell dividing the inside of said shell into an upper plenum, a lower plenum, and a heat exchanging passage between said upper plenum and said lower plenum bound by a portion of the wall of said shell extending between said upper and lower tube plates;
   a plurality of heat exchanger tubes disposed longitudinally in said heat exchanging passage, each of said heat exchanger tubes having upper and lower ends connected to said upper and lower tube plates, respectively, whereby said upper plenum and said lower plenum are communicatively joined;
   a support member provided with a plurality of through holes therein at portions corresponding to the lower end of said heat exchanger tubes and detachably mounted to a face of said lower tube plate; and
   means adjustably contacted to a portion of the lower ends of said heat exchanger tubes to constitute metal-to-metal seal contact and fixed to said through holes of said support member for causing a pressure loss of the fluid flows flowing downwardly through said heat exchanger tubes.

2. The heat exchanger according to claim 1 wherein said support member is a disc plate detachably secured to said face of said lower tube plate.

3. The heat exchanger according to claim 1 wherein said means for causing a pressure loss of the fluid flows comprises a plurality of metal-made throttling members each fixed to the through holes of said support member and further inserted into the lower end of the corresponding heat exchanger tube, each of said throttling members being provided with a fine central bore extending therethrough, an upper portion having a tapered outer surface inserted into said lower end of said heat exchanger tube and a lower cylindrical portion being continuous to said upper portion positioned outside said lower end of said heat exchanger tube when inserted so that said tapered outer surface has an area intimately contacted to a portion of said lower end of said heat exchanger tube to constitute metal-to-metal seal contact therebetween.

4. The heat exchanger according to claim 3 wherein said lower cylindrical portion of the throttling member has an outer surface in which screw threads are formed and each of said plurality of through holes is screw-engaged with the threads of said lower cylindrical portion of each of the throttling members so that their screw-engaged positions are relatively adjustable.

5. The heat exchanger according to claim 4 wherein said through holes of said support member have a diameter substantially equal to an outer diameter of said heat exchanger tubes.

6. The heat exchanger according to claim 1 wherein said heat exchanger is a naphtha vaporizer into which fluid naphtha is introduced.

7. A heat exchanger of vertical type in which fluid flows vertically downwardly, comprising:

a shell having sealed opposite ends;

a pair of upper and lower tube plates disposed in said shell dividing the inside of said shell into an upper plenum, a lower plenum, and a heat exchanging passage between said upper plenum and said lower plenum bound by a portion of the wall of said shell extending between said upper and lower tube plates;

a plurality of heat exchanger tubes disposed longitudinally in said heat exchanging passage, each of said heat exchanger tubes having upper and lower ends connected to said upper and lower tube plates, respectively, whereby said upper plenum and said lower plenum are communicatively joined;

a support member provided with a plurality of through holes therein at portions corresponding to the lower end of said heat exchanger tubes and detachably mounted to a face of said lower tube plate;

means connected to said upper plenum for introducing a fluid thereinto;

means provided at an upper portion of the wall of said shell bounding said heat exchanging passage for introducing heating gas thereinto;

means provided at a lower portion of the wall of said shell bounding said heat exchanging passage for discharging said heating gas after heat exchanging operation; and means for causing a pressure loss of the fluid flows, comprising a plurality of metal-made throttling members each fixed to said through holes of said support member and further inserted into a lower end of a corresponding heat exchanger tube, each of said throttling members being provided with a fine central bore extending therethrough, an upper portion having a tapered outer surface inserted into said lower end of said heat exchanger tube and a lower cylindrical portion being continuous to said upper portion positioned outside said lower end of said heat exchanger tube when inserted so that said tapered outer surface has an area intimately contacted to a portion of said lower end of said heat exchanger tube to constitute metal-to-metal seal contact therebetween.

8. The heat exchanger according to claim 7 wherein said heat exchanger is a naphtha vaporizer into which liquid state naphtha is introduced through said fluid introducing means.

9. The heat exchanger according to claim 8 further comprising means provided at said upper plenum for introducing a mixing gas consisting essentially of hydrogen gas and carbon dioxide gas, wherein said liquid state naphtha flowing through said fluid introducing means is atomized in said upper plenum and the atomized naphtha is mixed with said mixing gas before being distributed into said heat exchanger tubes.

* * * * *